No. 654,460. Patented July 24, 1900.
A. KIMBLE.
FIFTH WHEEL.
(Application filed Mar. 19, 1900.)
(No Model.)
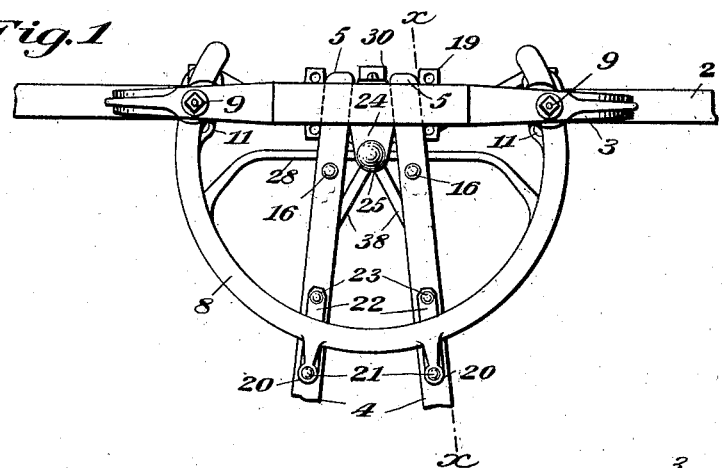
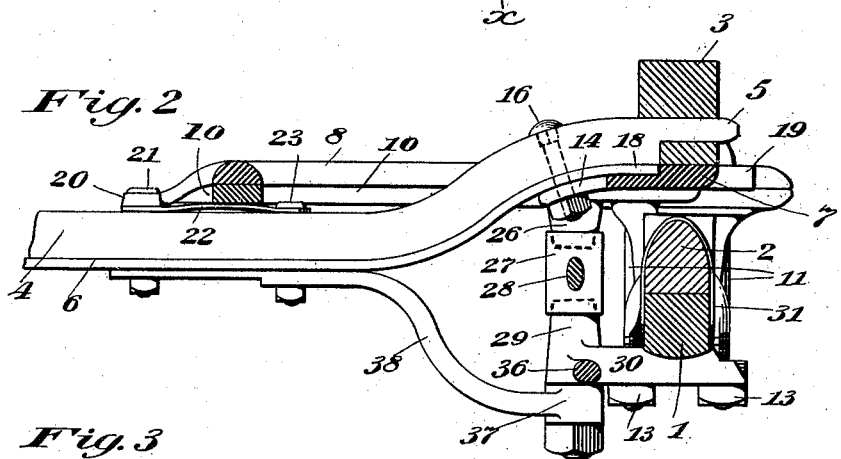
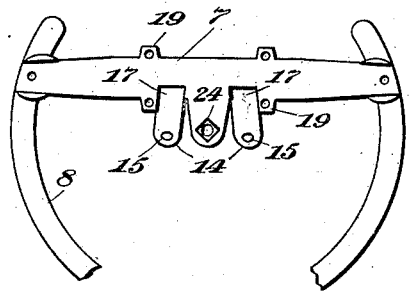
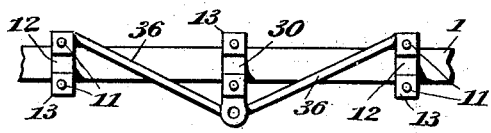
Witnesses
J. D. Thorne
E. W. Lewis
Inventor
Andrew Kimble,
by John Elias Jones,
his Attorney.

UNITED STATES PATENT OFFICE.

ANDREW KIMBLE, OF ZANESVILLE, OHIO.

FIFTH-WHEEL.

SPECIFICATION forming part of Letters Patent No. 654,460, dated July 24, 1900.

Application filed March 19, 1900. Serial No. 9,259. (No model.)

*To all whom it may concern:*

Be it known that I, ANDREW KIMBLE, a citizen of the United States of America, and a resident of Zanesville, in the county of Muskingum and State of Ohio, have invented certain new and useful Improvements in Fifth-Wheels, of which the following is a specification.

This invention relates to certain improvements in fifth-wheels for vehicles, and particularly in that class of these devices wherein the king-bolt is located at the rear of or behind the axle; and the object of the invention is to provide a fifth-wheel of this general character which shall be of a simple and inexpensive nature and of a strong and durable construction not liable to become deranged or broken while in use.

The invention consists in certain novel features of the construction, combination, and arrangement of the several parts of the improved fifth-wheel, whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is a plan view showing a fifth-wheel embodying my invention, and Fig. 2 is an enlarged vertical section taken through the same in substantially the plane indicated by the line $x\ x$ in Fig. 1. Fig. 3 is a plan view showing the upper circle and connected parts detached. Fig. 4 is a partial under side view showing the construction and arrangement of the lower clip-tie brace.

In the views, 1 indicates the axle, and 2 the axle-bed mounted thereon.

3 indicates the head-block or bolster, and 4 4 indicate the reaches, which are by my improved construction permitted to be formed throughout their entire length of wood, bent or curved upwardly at their forward ends, as clearly shown in Fig. 2, and passed through openings in the bolster or head-block 3, their forward ends, which pass through said openings, being reduced in thickness, as shown at 5. To afford sufficient strength to the reaches 4 4, they are reinforced on their under sides by metal strips 6.

7 indicates the head-block plate arranged under the bolster or head-block 3, to which it is secured by means of bolts 9 9 at its ends. The plate 7 is integrally formed with the upper circle 8, which extends behind the bolster and rests on the lower circle 10, which is connected at its forward ends to the axle by means of bolts 11, extending down upon opposite sides of the axle-bed and axle and held in place by means of tie-plates 12, extending across the lower side of the axle, beneath which plates the bolts carry nuts 13.

For the attachment of the forward ends of the reaches 4 the head-block plate 7 is provided at its rear edge with integral rearwardly-extending lugs or projections 14, bent down at their rear ends and adapted to lie beneath the metal reinforcing-strips 6 of the reaches and perforated, as shown at 15 in Fig. 3, for the passage of bolts 16, extending through the reaches and strips 6 and provided with nuts beneath said lugs or projections 14. The upper face of the plate 7 is also provided in front of said lugs or projections 14 with recesses 17 to receive the front ends of the strips 6, which fit therein, as shown at 18 in Fig. 2, and are held under the bolster 3 at this point. The head-block plate 7 is also provided at its front and rear edges with projecting apertured lugs 19 for the passage of clips (not shown) whereby the spring may be secured above the bolster 3.

For bracing and strengthening the reaches 4 at the rear of their upwardly-bent portions I provide the upper circle 8 with apertured arms 20, through which pass bolts 21, extending through the respective reaches and strips 6, and in order to prevent looseness and rattling of the lower circle 10 I provide springs 22, bent up at their central parts and arranged to press under the said lower circle, as shown in Fig. 2, to hold the same pressed tightly against the upper circle at all times, said springs having their rear ends held on the bolts 21 beneath arms 20 and their forward ends held on bolts 23, also extended through the reaches and strips 6 6.

24 indicates an apertured lug integrally formed on the head-block plate 7 and projected rearwardly therefrom between the lugs or projections 14, to which the reaches 4 are secured, and 25 indicates the king-bolt passed vertically through said lug 24, which has a depending boss 26 at its rear end, as shown in Fig. 2, through which said king-bolt passes, said boss being exteriorly tapered and having its lower end adapted to fit in a socket in the upper end of a collar 27, loose on the king-bolt and integral with the lower circle 10, to which it is connected by a brace 28. The collar 27 is also recessed in its under side to receive a tapered boss 29, extended upwardly from the rear end of a tie-plate 30, the forward end of which is extended under the axle directly in front of the king-bolt 25 and is secured to the axle and axle-bed by means of a clip 31, having nuts 13 beneath said tie-plate. The central tie-plate 30 is also integrally formed with the tie-plates 12 12, above referred to, and is connected therewith by brace arms or rods 36, which extend from opposite sides of the rear end of said central tie-plate 30 forwardly and laterally and are integrally connected to the forward ends of the outer tie-plates 12, as shown in Fig. 4. In this way it will be seen that not only does the central tie-plate 30 serve to bind the lower end of the king-bolt 25 to the axle to hold these two parts in proper relative positions, but said inclined arms or rods 36 also act to brace the central tie-plate and the king-bolt held thereby against lateral strains, so as to prevent the king-bolt from being loosened and shifted laterally at its lower end.

37 indicates the lower perch-brace, collared at its forward end on the king-bolt and having its rear end forked, as shown at 38, for attachment to the respective reaches 4, to which said forks are secured by means of the bolts 21 and 23, by which the antirattler-springs 22 are secured to the reaches.

The improved fifth-wheel constructed as above described is extremely simple and inexpensive and is especially well adapted for use, since it permits of employing bent wood reaches in connection with a king-bolt located at the rear of the axle and also affords means for holding the lower end of the king-bolt against lateral strains and movement as well as against rearward movement. It will also be obvious from the above description that the device is capable of considerable modification without material departure from the principles and spirit of the invention, and for this reason I do not wish to be understood as limiting myself to the precise form and arrangement of the several parts herein set forth.

Having thus described my invention, I claim—

1. In a fifth-wheel for vehicles, the combination of a head-block, a head-block plate secured thereto, an upper circle, an axle, a lower circle connected to the axle, a king-bolt located behind the axle and on which the lower circle turns, reaches bent up at their forward ends, lugs projected rearwardly from the head-block plate at opposite sides of the king-bolt, and bolts passed through the lugs and reaches for holding said parts together, substantially as set forth.

2. In a fifth-wheel for vehicles, the combination of a head-block, a head-block plate secured thereto, an upper circle, an axle, a lower circle having its forward ends rested on the axle, a king-bolt located behind the axle and on which the lower circle turns, bolts passed through the forward ends of the lower circle on opposite sides of the axle, tie-plates extended under the axle and through which said bolts pass, a central tie-plate having its rear end projected behind the axle and provided with a boss for the passage of the king-bolt, a clip on the axle and having arms passed through the central tie-plate, and brace-arms extended from opposite sides of the rear end of the central tie-plate and passed diagonally forward and laterally and having their outer ends integrally connected to the forward ends of the outer tie-plates, substantially as set forth.

3. In a fifth-wheel for vehicles, the combination of a head-block, an axle, upper and lower circles, the upper circle having projecting lugs at its rear part, a king-bolt on which the lower circle turns, reaches extended under the rear parts of the upper and lower circles and connected at their forward ends to the head-block, bolts passed through the lugs at the rear part of the upper circle and arranged to connect said upper circle to each of the reaches, and flat metal springs each having one end held beneath one of the lugs of the upper circle on the bolt which is passed through said lug and having its central portion bent upwardly into engagement with the under side of the lower circle, substantially as set forth.

Signed by me at Zanesville, Ohio, this 13th day of March, 1900.

ANDREW KIMBLE.

Witnesses:
ROBET. K. HINE,
JOHN C. SULLIVAN.